(12) United States Patent
Ha

(10) Patent No.: US 6,566,616 B1
(45) Date of Patent: May 20, 2003

(54) MULTIPLE SWITCH MODULE

(75) Inventor: David W. Ha, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/000,670

(22) Filed: Oct. 31, 2001

(51) Int. Cl.[7] ................................................. H01H 9/00
(52) U.S. Cl. ................................. 200/61.54; 200/61.27
(58) Field of Search .......................... 200/61.54, 61.27, 200/4, 17 R

(56) References Cited

U.S. PATENT DOCUMENTS

| | | | |
|---|---|---|---|
| 5,453,588 A | 9/1995 | DuRocher et al. | |
| 5,473,809 A | 12/1995 | DuRocher et al. | |
| 5,523,730 A | 6/1996 | Van Zeeland | |
| 5,610,378 A | 3/1997 | DuRocher et al. | |
| 5,666,096 A | 9/1997 | Van Zeeland | |
| 5,724,719 A | 3/1998 | DuRocher et al. | |
| 5,742,014 A | 4/1998 | Schwartz et al. | |
| 5,952,633 A | 9/1999 | Leveque et al. | |
| 5,990,772 A | 11/1999 | Van Zeeland | |
| 6,020,563 A | * 2/2000 | Risk et al. | 200/61.54 |
| 6,025,564 A | 2/2000 | Verduci et al. | |
| 6,114,640 A | 9/2000 | Oddo et al. | |
| 6,384,351 B1 | * 5/2002 | Schwartz et al. | 200/61.27 |

OTHER PUBLICATIONS

Pushgate™ Pushbutton Fact Sheet of Duraswitch Ind, Inc., Mesa, AZ 2 pgs Believed Dated Earlier than Oct. 31, 2000.
thiNcoder™ Rotor Fact Sheet of Duraswitch Ind, Inc. Mesa, AZ 1 pg Believed Dated Earlier than Oct. 31, 2001.

* cited by examiner

Primary Examiner—Elvin Enad
Assistant Examiner—M. Fishman
(74) Attorney, Agent, or Firm—Thomas N. Twomey

(57) ABSTRACT

A multiple switch module which is adaptable for inclusion in stalk switches, including a central cylinder, a multi-switch unit located within the central cylinder, a selections annulus rotatably mounted concentrically outside the central cylinder and operably connected by a cross-bar to a first rotary switch of the multi-switch unit, a selections cylinder rotatably mounted to a forward end of the central cylinder and operably connected to a second rotary switch of the multi-switch unit, and a selection button biasably mounted in reciprocable relation to the selections cylinder and operably connected to a momentary switch of the multi-switch unit. A slot system is formed in the central cylinder to accommodate rotative movement of the cross-bar relative to the central cylinder.

10 Claims, 3 Drawing Sheets

MULTIPLE SWITCH MODULE

TECHNICAL FIELD

The present invention relates to multiple switch devices, as for example stalk switches, and more particularly to a multiple switch module which has a simplified construction.

BACKGROUND OF THE INVENTION

Stalk switches have become increasingly favored for automotive applications as the complexity of driver selectable electrical devices has rapidly increased. Stalk switches are favored because of their inherent convenience emanating out of their steering column mounting and their capacity for multiple switch functions on a single stalk.

A typical stalk switch may include one or two separate rotary switches, each providing a separate range of electrical settings, as for example to define wiper and lighting operations. Stalk switches may further include a momentary-type button switch at the end of the stalk which provides an electrical setting when depressed, as for example washer operation. Additionally, stalk switches are mounted so as to be articulated about one or two axes, each articulation providing a selected electrical setting (as for example turn signal and bright lights operations).

While stalk switches have gained favor with both drivers and vehicle manufacturers, the art remains dependent upon complicated structures, having a multiplicity of parts. As a result, stalk switches for all their laudable attributes yet remain a significant cost for vehicle manufacturers, in terms of both original manufacturing cost and warranty service cost.

Acordingly, what remains needed in the art is a stalk switch which is simplistic in construction, having a small number of parts.

SUMMARY OF THE INVENTION

The present invention is a multiple switch module which is adapatable for inclusion in stalk switches, the module having a simple construction with few parts.

The multiple switch module according to the present invention includes a central cylinder, a multi-switch unit located within the central cylinder, a selections annulus rotatably mounted concentrically outside the central cylinder and operably connected to a first rotary switch of the multi-switch unit, a selections cylinder rotatably mounted to a forward end of the central cylinder and operably connected to a second rotary switch of the multi-switch unit, and a selection button biasably mounted in reciprocable relation to the selections cylinder and operably connected to a momentary switch of the multi-switch unit.

By way of preferred example, the selections annulus has a cross-bar mounted first stem seat for receiving therein a first stem of the first rotary switch. In order to accommodate rotary movement of the selections annulus, the central cylinder is provided with a slot system in the from of a pair of axial slots and a circumferential slot, respectively, at each axial slot. By way of further example, the selections cylinder includes a second stem seat for receiving therein a second stem of the second rotary switch, and additionally includes a push rod which passes through the second rotary switch and its second stem and pressably operates the momentary switch which is sandwiched between the first and second rotary switches.

Accordingly, it is an object of the present invention to provide a multiple switch module which has a simplistic construction, and which is adaptable for integration into a stalk switch.

This and additional objects, features and advantages of the present invention will become clearer from the following specification of a preferred embodiment.

DESCRIPTION OF THE PREFERRED EMBODIMENT

Figure 1:
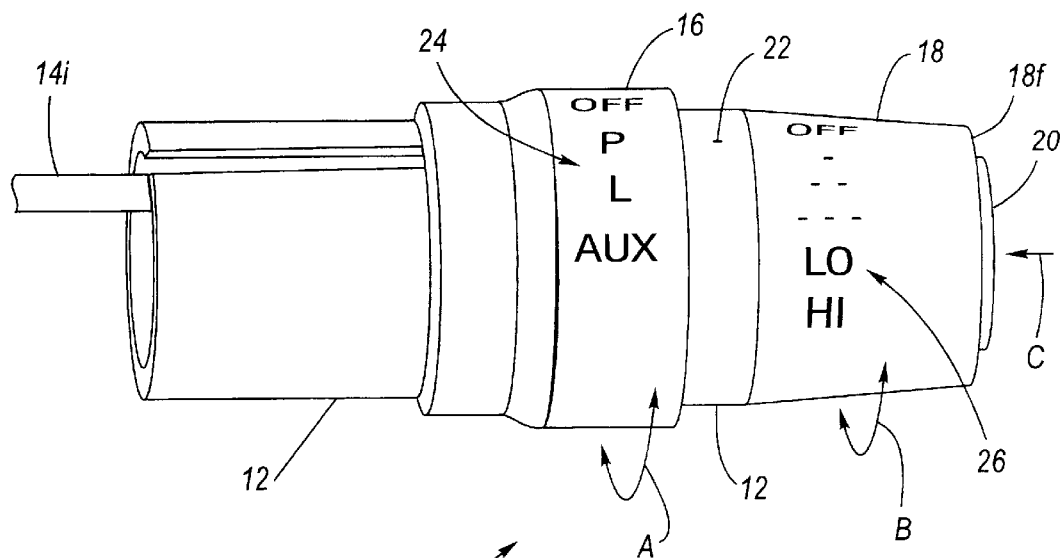
FIG. 1 is a perspective side view of the multiple switch module according to the present invention.
Figure 2:
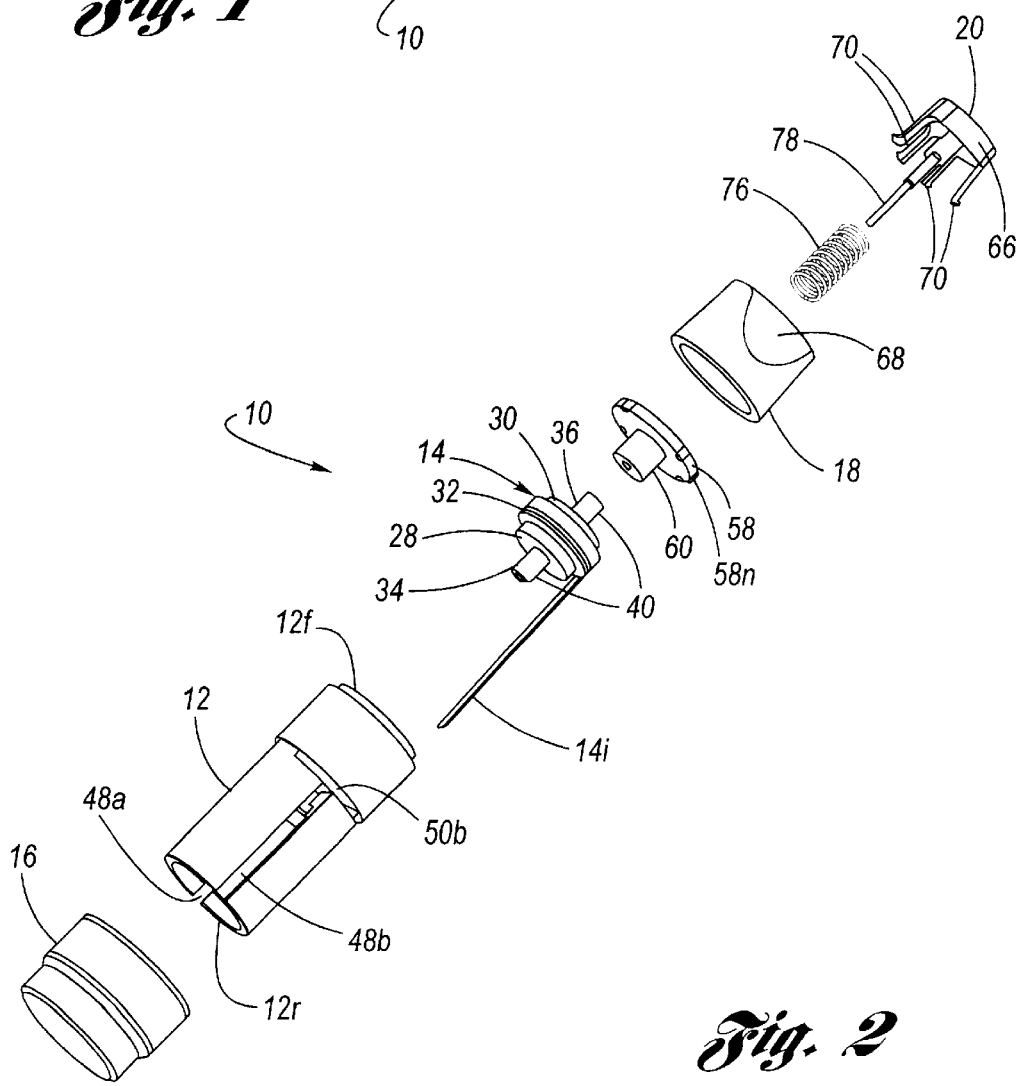
FIG. 2 is an exploded view of the multiple switch module according to the present invention.
Figure 3:
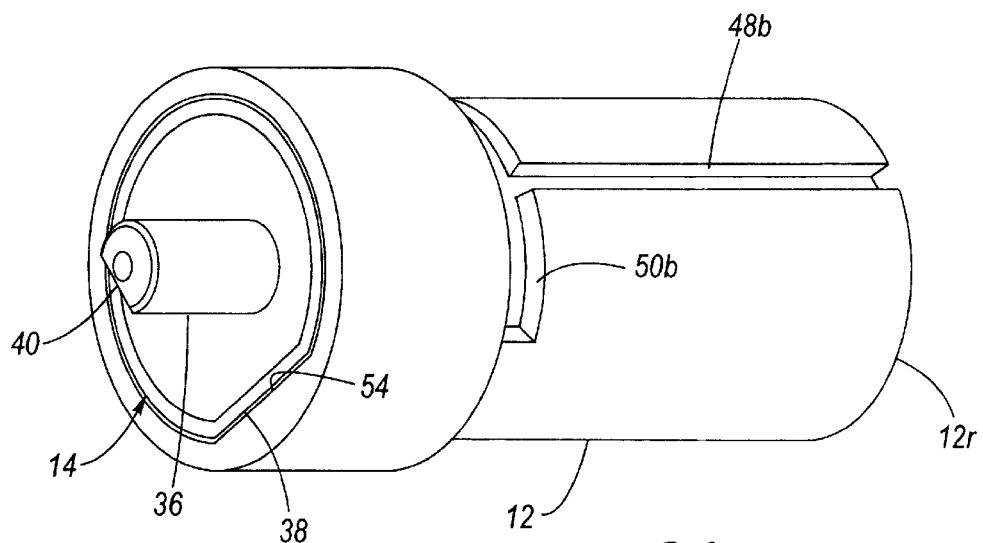
FIG. 3 is a perspective view of a central cylinder and multi-switch unit of the multiple switch module according to the present invention.

Referring now to the Drawing, FIG. 1 depicts a view of a preferred embodiment of a multiple switch module 10 according to the present invention. The multiple switch module 10 includes a central cylinder 12, a multi-switch unit 14 (see FIG. 2) located within the central cylinder, a selections annulus 16 rotatably mounted concentrically outside the central cylinder and operably connected to the multi-switch unit, a selections cylinder 18 rotatably mounted to a forward end of the central cylinder and operably connected to the multi-switch unit, and a selection button 20 biasably mounted in reciprocable relation to the selections cylinder and operably connected to the multi-switch unit.

In operation, the central cylinder is fixed rotatively and axially, and may be articulatingly mounted to a base, wherein the articulation relative to the base provides switch functioning in the manner known of stalk switches. Between the selections cylinder 18 and the selections annulus 16 a portion of the central cylinder 12 has reference indicia 22, and each of the selections annulus and selections cylinder have selections indicia 24, 26 that are respectively indicative of switch settings of the multi-switch unit 14. In this regard, the selections annulus 16 may be rotated, per arrow A, relative to the central cylinder to provide selection of a switch setting of a first set of switch settings, and the selections cylinder 18 may be rotated, per arrow B, (independently of the selections annulus) relative to the central cylinder to provide selection of a switch setting of a second set of switch settings. The selection button 20 is biased outwardly relative to the forward end 18f of the selections cylinder 18, wherein depression thereof, per arrow C, results in a switch setting selection of the multi-switch unit 14. A preferred component configuration of the multiple switch module 10 is depicted at FIGS. 2 through 6.

The multi-switch unit 14 is composed of a first rotary switch 28, a second rotary switch 30 and a momentary switch 32 sandwiched therebetween. The rotary switch 28, 30 may be any suitable type on the market, as for example described in U.S. Pat. No. 5,666,096, and as for preferable example thiNcoder™ rotor of Duraswitch Ind., Inc., Mesa, Ariz. The preferred momentary switch 32 is a membrane switch of any suitable type on the market, as for example described in U.S. Pat. Nos. 5,523,730 and 5,990,772, and as for preferable example PUSHGATE™ pushbutton switch, also of Duraswitch Ind., Inc. It is to be understood that while certain products of Duraswitch Ind., Inc. have been indicated as preferred, these products are indicated as exemplary, and may be freely substituted with other products of other manufacturers.

The first rotary switch 28 is attached to, or otherwise held adjacent to, the second rotary switch so that the first stem 34 of the first rotary switch faces diametrically away from the second stem 36 of the second rotary switch 30. The attachment may be by any suitable modality which serves to trap the momentary switch 32 therebetween. The multi-switch unit 14 has a flat 38, and each of the first and second stems 34, 36 are also provided with a flat 40. Each of the first and second rotary switches has a number of switch settings which correspond to the indicia 24, 26, respectively, on the selections annulus 16 and selections cylinder 18. An electrical interface 14*i* connects with the first and second rotary switches 28, 30 and the momentary switch 32. A preferred electrical interface 14*i* is a flex-cable, and is used to provide an electrical interface of the multi-switch unit 14 with an external electrical circuit.

Figure 4:
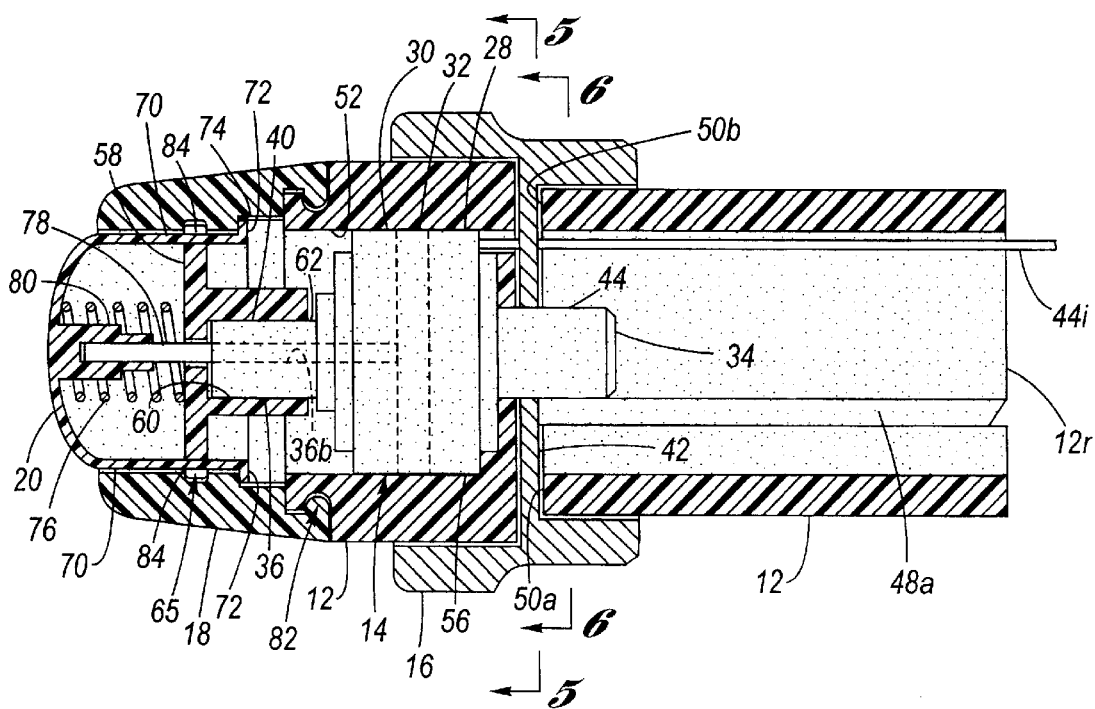
FIG. 4 is a partly sectional side view of the multiple switch module according to the present invention.
Figure 5:
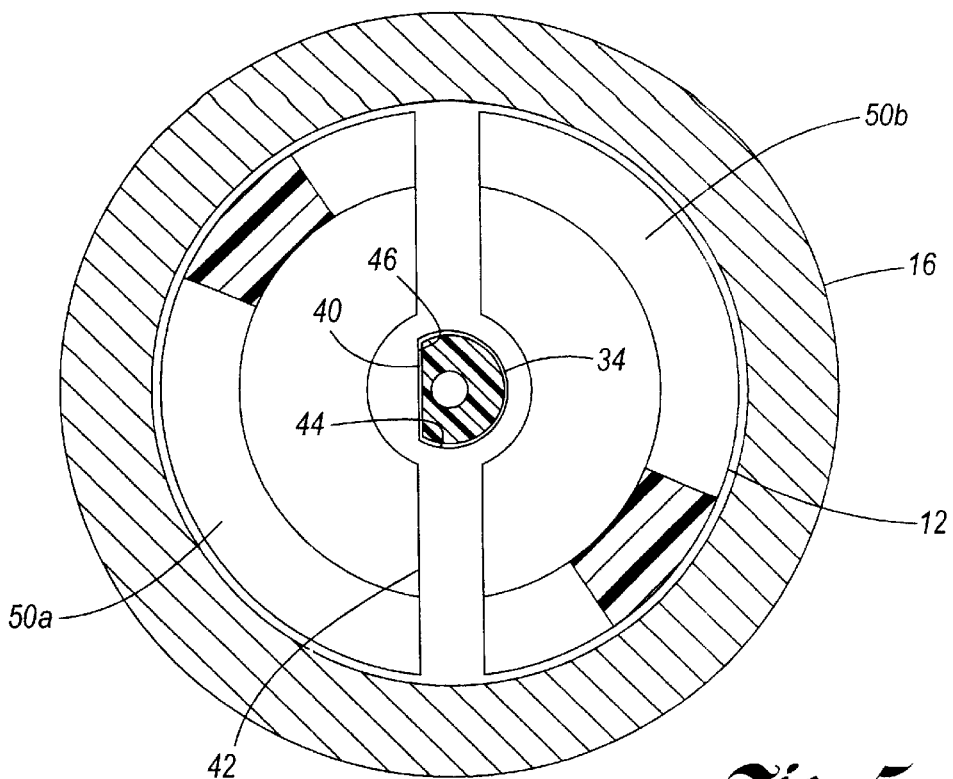
FIG. 5 is a partly sectional view, seen along line 5—5 of FIG. 4.
Figure 6:
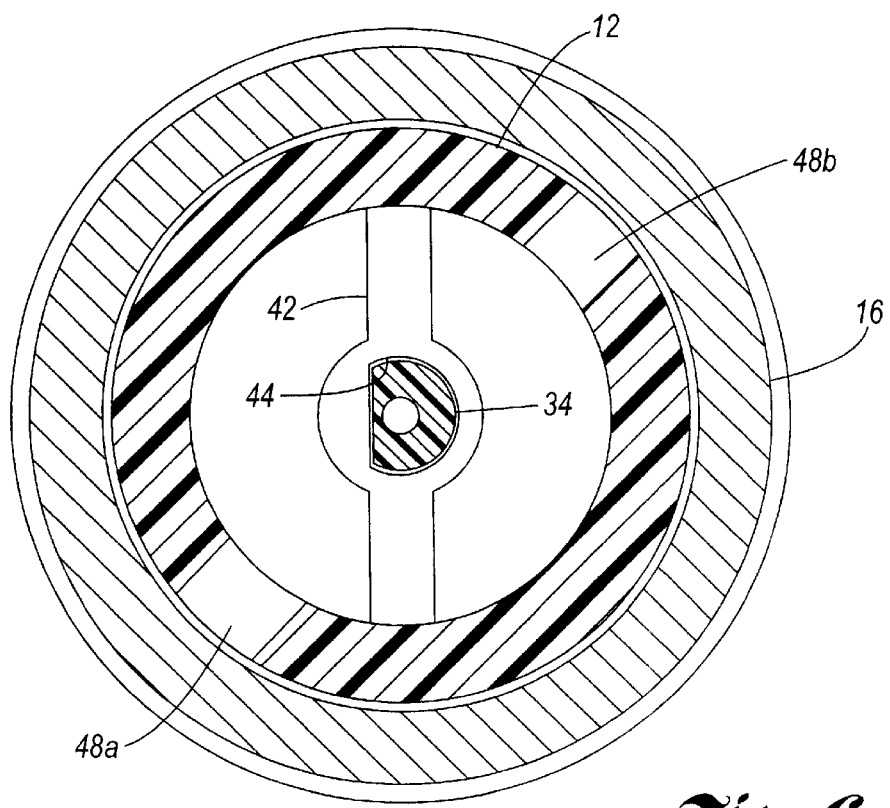
FIG. 6 is a partly sectional view, seen along line 6—6 of FIG. 4.

As best shown at FIGS. 4 and 5, the selections annulus, which may be preferably composed of metal, has a cross-bar 42 at the center of which is located a first stem seat 44 which snuggly receives the first stem 34, wherein a flat 46 thereof abuts the flat 40 of the first stem.

In order for the selections annulus 16 to be concentrically located medially upon the central cylinder 12 and further be rotatable therewith even in view of the cross-bar 42, the central cylinder is provided with a slot system including a pair of axial slots 48*a*, 48*b* which communicate with the rear end 12*r* thereof. The slot system further includes a circumferential slot 50*a*, 50*b* communicating, respectively, with each of the axial slots 48*a*, 48*b*. Accordingly, the selections annulus 16 is placed concentrically over the central cylinder 12 from the rear end 12*r* thereof, whereby the cross-bar 42 slides along the axial slots 48*a*, 48*b*. Upon the cross-bar 42 reaching the blind end of the axial slots 48*a*, 48*b*, the cross-bar is rotatively movable along the circumferential slots 50*a*, 50*b*. In this regard, the rotative freedom of movement of the selections annulus 16 relative to the central cylinder 12, which is provided by the circumferential slots 50*a*, 50*b* relative to the cross-bar 42, must be at least equal to the rotation of the first stem 34 necessary to effect the full range of switch settings to be accessed of the first rotary switch 28.

The front end 12*f* of the central cylinder 12 has a multi-switch unit seat 52. In this regard, the multi-switch unit 14 is inserted into the multi-switch unit seat 52, wherein a flat 54 thereof abuts the flat 38 of the multi-switch unit, thereby preventing the multi-switch unit from rotating relative to the central cylinder 12; however, the first and second stems 34, 36 can rotate as a consequence of the internal construction of the first and second rotary switches 28, 30. An abutment 56 of the multi-switch unit seat 52 abuttably seats the multi-switch unit 14 so that the first stem 34 projects centrally therethrough.

The selections cylinder 18 has preferably a truncated cone shape, and has a hollow interior to which is connected a disk 58, as for example by an interfering, non-rotative (via a nib 58*n*) snap-fit 65, adhesive, sonic welding etc. The disk 58 has a centrally disposed second stem seat 60 configured to receive therein the second stem 36, wherein a flat 62 thereof abuts the flat 40 of the second stem. Accordingly, rotation of the selections cylinder 18 results in rotation of the second stem 36, and the amount of rotative freedom of the selections cylinder is determined by the inherent rotative freedom of the second stem, or, by abutments provided between the selections cylinder and its disk relative to the central cylinder. The rotary connection of the selections cylinder 18 to the central cylinder may be accomplished for example by a snap fit 82 therebetween or by the second stem seat 60 attaching to the second stem 36 with the multi-switch unit 14 being attached, in turn, to the multi-switch unit seat 52.

The selection button 20 fits into an end aperture 64 at the end 18*f* of the selections cylinder 18. Preferably the selection button 20 and its form fitting end aperture 64 each have a flattened portion (see flattened portion 66 of the selection button in FIG. 2) to accommodate a thumb placement bevel 68 in the selections cylinder 18. In order for the selection button 20 to be axially movable inside the selections cylinder 18, the selection button is provided with fingers 70 having feet 72 which abut an annular abutment 74 of the selections cylinder 18 when at its most outward position. The feet 72 pass through recesses 84 in the periphery of the disk 58. The selection button is normally biased to the most outward position by a spring 76 compressed between the selection button and the disk 58.

A push rod 78, preferably composed of metal, is connected to the selection button 20 via a mounting member 80. The push rod 78 passes through the disk 58, the second stem seat 60, the second stem 36 via a bore 36*b*, and the second rotary switch 30, and terminates adjacent the momentary switch 32. When the selection button 20 is depressed relative to the rear end 18*f* of the selections cylinder 18, overcoming the biasing of the spring 76, the push rod pushes against the momentary switch 32, thereby changing its electrical state. The depressability of the connection button 20 is independent of the rotational position of the selections cylinder 18 relative to the central cylinder 12.

To those skilled in the art to which this invention appertains, the above described preferred embodiment may be subject to change or modification. In this regard, it will be noted by those having ordinary skill in the relevant art, that the multiple switch module may be used in any electrical application, and that one of these applications is a stalk switch application. Such change or modification can be carried out without departing from the scope of the invention, which is intended to be limited only by the scope of the appended claims.

What is claimed is:

1. A multiple switch module, comprising:
    a central cylinder having a rear end, a front end and a slot system formed therein, wherein said slot system comprises:
        a pair of axially oriented slots communicating with said rear end; and
        a pair of circumferential slots, each circumferential slot communicating with a respective axially oriented slot;
    a selections annulus concentrically disposed exteriorly relative to said central cylinder, said selections annulus being rotatable relative to said central cylinder, said selections annulus having a cross-bar positioned in said slot system, wherein said cross-bar slides in said pair of cicumferential slots as said selections annulus rotates relative to said central cylinder; and
    a rotary switch disposed inside said central cylinder, said rotary switch being connected to said central cylinder and also connected to said cross-bar;
    wherein rotation of said selections annulus relative to said central cylinder causes selective actuation of said rotary switch.

2. The multiple switch module of claim 1, further comprising:

a selections cylinder located at said forward end of said central cylinder in rotational relation therewith; and a second rotary switch disposed inside said central cylinder, said second rotary switch being connected to said central cylinder and also connected to said selections cylinder;

wherein rotation of said selections cylinder relative to said central cylinder causes selective actuation of said second rotary switch; and wherein said rotations of each of said selections annulus and said selections cylinder are mutually independent.

3. The multiple switch module of claim 2, further comprising:

a momentary switch disposed within said central cylinder; and a selection button axially movable in relation to said selections cylinder, said selection button having a push rod terminating adjacent said momentary switch;

wherein axial movement of said selection button in a direction toward said central cylinder causes said push rod to push against said momentary switch so as to thereby change its electrical state.

4. The multiple switch module of claim 3, wherein said selection button is normally biased in a direction away from said central cylinder, and wherein said axial movement of said selection button is operable independently of said rotation of said selections cylinder.

5. The multiple switch module of claim 4, wherein said momentary switch is sandwiched between said first rotary switch and said second rotary switch, and wherein said push rod passes through said second rotary switch.

6. A multiple switch module, comprising:

a central cylinder having a rear end, a front end and a slot system formed therein;

a selections annulus concentrically disposed exteriorly relative to said central cylinder, said selections annulus being rotatable relative to said central cylinder, said selections annulus having a cross-bar positioned in said slot system; and a multi-switch unit disposed inside said central cylinder, said multi-switch unit comprising a first rotary switch, a second rotary switch and a momentary switch sandwiched therebetween, said first rotary switch being connected to said central cylinder and also connected to said cross-bar;

wherein rotation of said selections annulus relative to said central cylinder causes selective actuation of said first rotary switch.

7. The multiple switch module of claim 6, wherein said slot system comprises:

a pair of axially oriented slots communicating with said rear end; and a pair of circumferential slots, each circumferential slot communicating with a respective axially oriented slot.

8. The multiple switch module of claim 7, further comprising a selections cylinder located at a forward end of said central cylinder in rotational relation therewith; wherein said second rotary switch is connected to said central cylinder and also connected to said selections cylinder; wherein rotation of said selections cylinder relative to said central cylinder causes selective actuation of said second rotary switch; and wherein said rotations of each of said selections annulus and said selections cylinder are mutually independent.

9. The multiple switch module of claim 8, further comprising a selection button axially movable in relation to said selections cylinder, said selection button having a push rod terminating adjacent said momentary switch; wherein axial movement of said selection button in a direction toward said central cylinder causes said push rod to push against said momentary switch so as to thereby change its electrical state.

10. The multiple switch module of claim 9, wherein said selection button is normally biased in a direction away from said central cylinder, and wherein said axial movement of said selection button is operable independently of said rotation of said selections cylinder.

\* \* \* \* \*